H. W. Collender.
Billiard Cushions.
No 18,805. Patented Dec. 8, 1857.

Witnesses:
Andrew DeLa[?]
W[?]

Inventor:
Hugh W Collender

UNITED STATES PATENT OFFICE.

H. W. COLLENDER, OF NEW YORK, N. Y.

BILLIARD-TABLE CUSHION.

Specification forming part of Letters Patent No. 18,805, dated December 8, 1857; Reissued August 23, 1859, No. 799.

*To all whom it may concern:*

Be it known that I, HUGH W. COLLENDER, of the city, county, and State of New York, have invented a new and useful Improvement in Combination Billiard-Cushions; and I do hereby declare that the following is a full, clear, and exact description of the same, reference being had to the accompanying drawings, forming part of this specification, in which—

Figure 2:
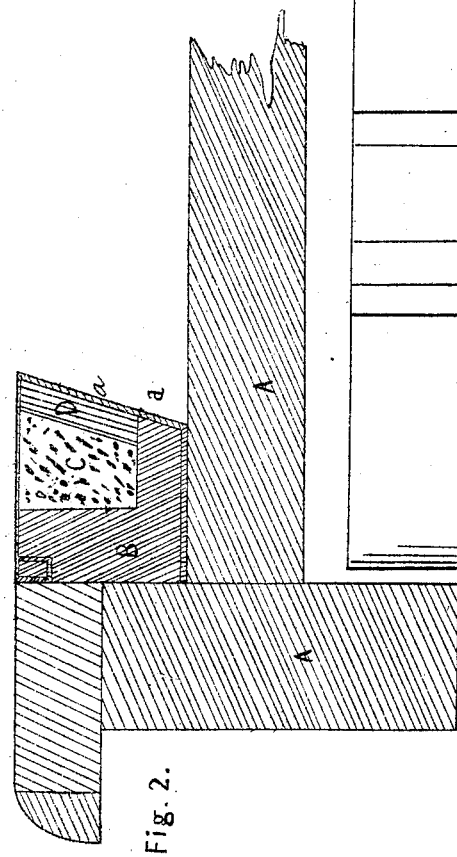
Figure 1:
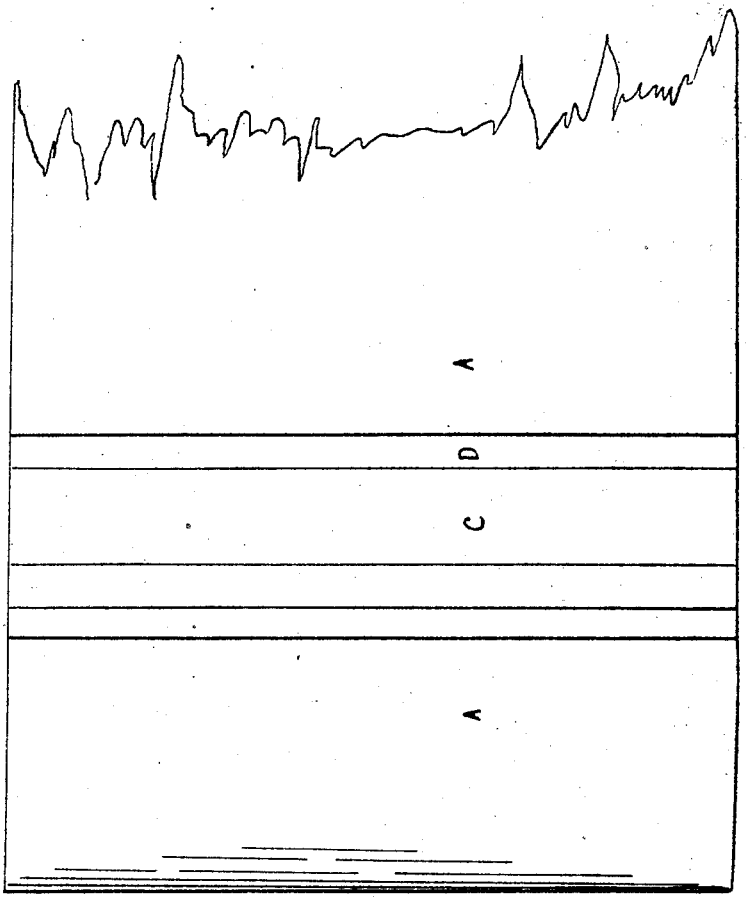

Figure 1 is a plan or top view of a portion of one side of a billiard table with my combination cushion. The woolen covering of the cushion being removed. Fig. 2 is a vertical transverse section of the same, the woolen covering being in place.

Similar letters of reference in each of the several figures indicate corresponding parts.

My invention relates to an improvement in the mode of producing a billiard cushion, which employs in its construction the principle patented by M. Phelan in 1856, to wit, a face comparatively solid and a back or foundation perfectly elastic, said construction of cushion insuring for the billiard player the performance by the ball of angles correct enough to fulfil the scientific requirements of the game.

The nature of my invention consists in a cushion which employs to produce its repellent force an elastic rubber block which has its face formed of rubber belting or other rubber which is more dense and has less compressibility than the elastic block.

The union between the comparatively solid rubber facing and the elastic foundation being effected, either by placing the facing in a mold and pouring the fluid rubber into the same mold behind it, or by first molding the block and then cementing or otherwise attaching the facing to it.

The following several advantages are derived from the use of the rubber belting in the manner above stated, over cork, whalebone, or steel: 1st, rubber belting in one continuous piece can be readily secured at a very small cost which is not the case with fine silk cork. 2nd, the belting is very durable, not being liable to crumble and produce an irregular surface, as is the case with cork and whalebone. 3rd, the surface produced is not quite so solid as when cork, whalebone, or steel are used, and yet sufficiently so to answer the end desired, and thus the balls are not worn so rapidly and the unpleasant disagreeable sound or "bang" which is heard, by reason of the contact of the ball when the steel strip is employed is prevented. 4th, the belting possesses within itself the properties of uniting with the rubber or is capable of readily being cemented together by any of the processes practiced in the rubber manufacture and thus the trouble of nicely adjusting the facing to the back or foundation experienced in the adoption of any of the other combinations is avoided and therefore any ordinary workman can produce a billiard table equal if not better in effect than those which require the most skilful workman to make them when either of the other combinations mentioned are employed in place of mine.

To enable others skilled in the art to make and apply my invention, I will proceed to describe the proportions of the parts, relative position of the same, and the manner of applying the cushion to a billiard table.

A, represents a billiard table of usual or most approved construction.

B, is the cushion, shelf, or bed.

C, is the elastic block of rubber; and D, the thin strip of rubber belting.

The elastic block C, is generally more than double the thickness of the rubber strip, and should be perfectly elastic.

The rubber strip D, which is comparatively nonelastic laterally, but capable of expanding longitudinally, is placed on the front side of the rubber block as shown and cemented to it with rubber cement or otherwise fastened. Or the facing may be placed in a mold and the fluid rubber poured into the same mold behind it and the two rubbers caused to unite together by reason of the adhesive properties contained within themselves.

The cushion thus made and arranged is covered by thin woolen cloth $a$, as shown.

A cushion made as above described presents a face which is comparatively solid and a back perfectly elastic and thus the same advantage which is secured by the use of cork, steel, or whalebone, is attained, to wit: the exemption of the ball from being embedded into the surface of the cushion and the consequent reflection of the ball at an angle the equivalent or thereabouts of the angle of incidence.

I do not claim a cushion with a comparatively solid face and perfectly elastic back when formed of rubber, cork, and leather, as this was patented by M. Phelan in 1856; but I do claim as a new, better, and cheaper mode of carrying out the principle involved in said cushion:

The use of the two rubbers possessing the different qualities or degrees of elasticity herein specified for the purpose of producing a rubber spring cushion with a comparatively solid rubber face and an elastic rubber back, substantially as set forth.

The above specification of my improvement in combination billiard cushion signed by me this 30th day of October, 1857.

HUGH W. COLLENDER.

Witnesses:
CHAS. G. HALPINE,
DUDLEY KAVANAGH.

[FIRST PRINTED 1911.]